B. S. CAMERON.
AIRPLANE LANDING DIRECTOR
APPLICATION FILED MAR. 1, 1919.
1,422,922.
Patented July 18, 1922.
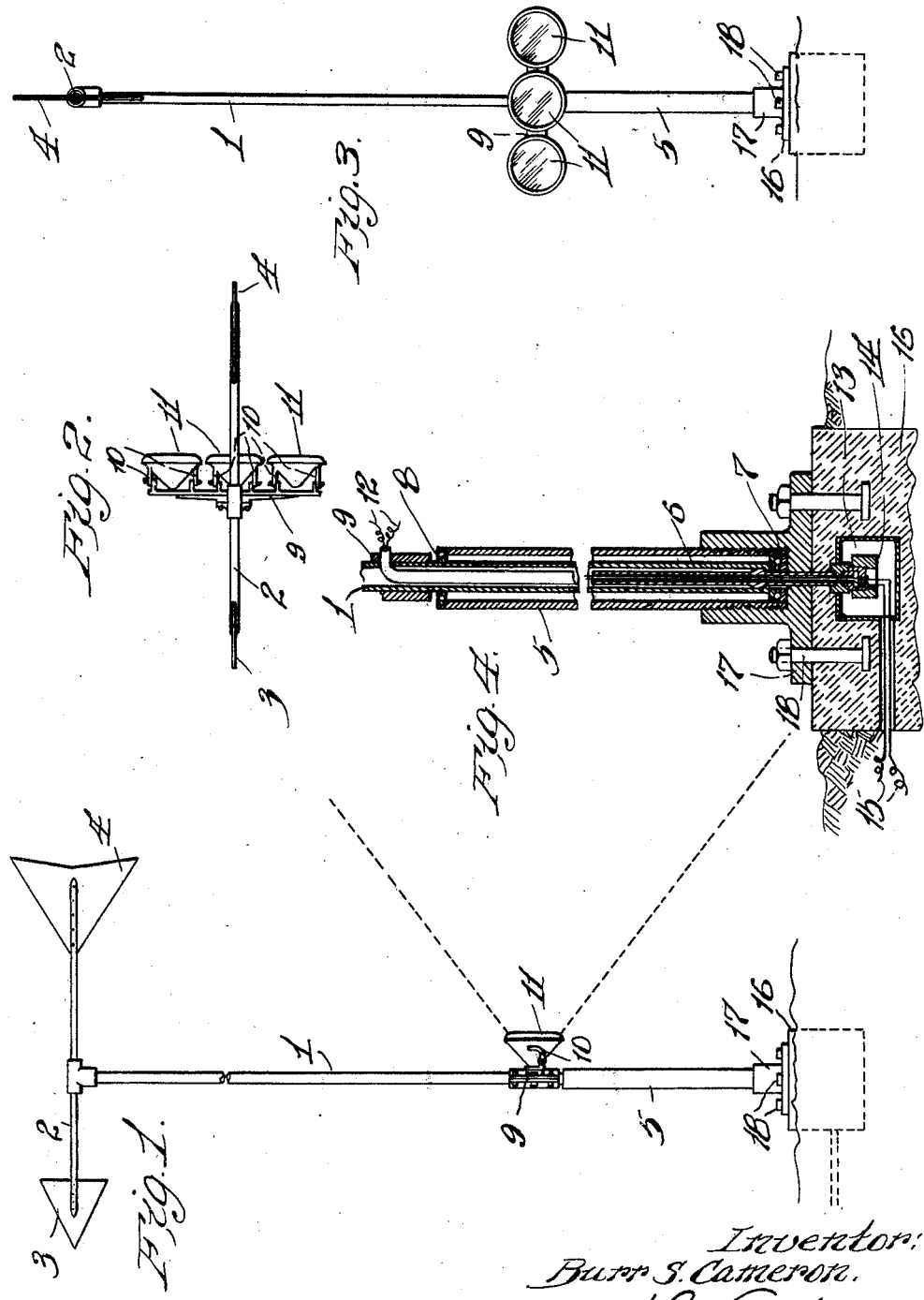
Inventor:
Burr S. Cameron.
By N. G. Fletcher
Atty.

UNITED STATES PATENT OFFICE.

BURR S. CAMERON, OF DOUGLASSVILLE, TEXAS.

AIRPLANE LANDING DIRECTOR.

1,422,922.  Specification of Letters Patent.  Patented July 18, 1922.

Application filed March 1, 1919. Serial No. 279,933.

*To all whom it may concern:*

Be it known that I, BURR S. CAMERON, a citizen of the United States of America, and a resident of Douglassville, in the county of Cass and State of Texas, have invented certain new and useful Improvements in Airplane Landing Directors, of which the following is a specification.

The primary object of this invention is to provide an improved directing device for indicating the landing direction to the pilot of an airplane.

Another object is to provide an improved night signalling and directing device for airplanes relative to signalling to the pilot of the plane the direction in which the wind is blowing, so that the pilot can effect a landing in the essential wind direction.

Other and further objects will appear in the specification and be specifically pointed out in the appended claims, reference being had to the accompanying drawings exemplifying the invention, and in which, Figure 1 is a side elevation of this improved airplane landing director.

Figure 2 is a plan view of the device.

Figure 3 is a front elevation of Fig. 2.

Figure 4 is an enlarged fragmentary section of the lower portion of the device showing the side and end thrust bearings and the electrical wiring required relative to the light emitting elements of the device.

Referring to the drawings this improved airplane landing director is composed of a vertically arranged turnably mounted supporting standard 1, to the upper end of which is secured a weather vane 2, said weather vane having an indicating portion 3, and a guiding portion 4.

For supporting said standard 1 in its vertical position, a hollow post 5 is provided, the lower end 6 of said standard 1 being mounted in said post and supported endwise by the end thrust bearing 7. Arranged in the post 5 adjacent its upper end is a side thrust bearing 8, being in engagement with the revolving surface of the standard 1.

Secured to the standard 1 above the upper end of the post 5 is a transversely arranged bracket 9, and carried by said bracket by adjustable members 10 is a plurality of lamps or light emitting elements 11, the lenses of said elements being directed rearwardly relative to the directing portion 3 of the weather vane 2.

The standard 1 is preferably of tubular construction so that electric lighting wires such as 12 can be extended upwardly therein through the lower end thereof for supplying the lamps 11 with electrical current, the lower ends of said wires being connected to a revolving connection 13 which is mounted in a stationary socket 14, to which the supply wires 15 lead, said connection 13 and socket 14 being mounted in the base 16 to which the post 5 is secured by a flange 17 and foundation bolts 18.

Heretofore in the night landing of airplanes, the same has been carried on under dangerous and tedious conditions, as the landing of an airplane is generally more successfully accomplished when the aviator or pilot of the airplane will alight on the ground in a heading direction relative to the travelling air currents or wind as pertaining to atmospheric conditions, but since the aviator in flight cannot very well tell whether he is heading against the wind direction, a successful landing is not always accomplished. This improved airplane landing director is therefore adapted to indicate to the pilot in landing at night, as the pilot will direct his airplane in an alining direction with the light rays, which indicate to him that the wind is coming in the direction the light rays are projected, as the projecting position of the lamps is controlled by the weather vane 2.

These lamps carried by the standard 1 are adjusted so that the light rays thereof are projected so as to engage the ground, for by so doing the nature of the ground will be indicated to the aviator just before he alights.

In the event that this improved airplane landing director is mounted on sloping ground, it is to be understood that the standard 1 in all cases must be vertically mounted, in which case the adjusting members 10 of the lamps 11 are adapted to adjust the lamps relative to a proper reflecting light being thrown to the ground and to the pilot or aviator.

It is obvious that in calm weather there will be no wind direction to indicate which however is immaterial to the aviator, as he will land at a direction heading towards the projecting rays of light.

What I claim is:—

1. An airplane landing director comprising a turnable support, a member co-operable with said support for turning it, being susceptible of actuation by air currents, and a light emitting element carried by said support in a position wherein the light rays thereof will be thrown in an alining direction with the air currents.

2. An airplane landing director comprising a turnable support, a member co-operable with said support for turning it, being susceptible of actuation by air currents, and a light emitting element carried by said support, said member adapted to cause the light rays of said light emitting element to be directed in alinement with said element and rearwardly thereof.

3. An airplane director comprising a turnable support, a light emitting element carried by said support, and a weather vane co-operable with said support, said element being positioned so as to cause the light rays therefrom to be directed rearwardly of said weather vane.

4. An airplane director comprising a vertically extending turnable support, a series of light emitting elements horizontally carried by said support, and a weather vane co-operable with said support, said light emitting element adapted to throw its light rays in a rearward alining direction with said weather vane.

5. An airplane landing director comprising a vertically arranged turnably mounted member, a weather vane carried adjacent the upper end of said member, a light emitting element adjustably secured to said member, and positioned so as to direct the light rays thereof in a direction opposite to which the directing end of said weather vane is pointing, and a support for the lower end of said member for allowing said member to turn therein.

BURR S. CAMERON.